Patented Nov. 4, 1930

1,780,154

UNITED STATES PATENT OFFICE

DANIEL GARDNER, OF RUEIL, FRANCE

MANUFACTURE OF HIGH-PURITY CARBON

No Drawing. Application filed October 10, 1927, Serial No. 225,403, and in Great Britain March 5, 1927.

This invention relates to and has for its object the provision of an improved process for the production of impalpable carbon substantially free from organic and inorganic impurities, involving treatment of charcoal or other solid precarbonized carbonaceous material with alkalis and acids and high temperature heat treatment of the chemically treated product. The starting material that is a product of carbonization contains as is known organic compounds, inorganic compounds and moisture and these interfere greatly with the wide technical application of the product and their elimination is essential if a product of high purity is to be obtained.

In known processes the starting material may be treated in various ways for instance first with alkali and, after washing, with acid, whereupon the product is heated to a high temperature. In certain of these processes, however, the fibrous or like structure of the incinerated starting material is retained and exists in the final product and consequently no attempt is made to reduce said material to a state of division such as favours really efficient or complete removal of the impurities referred to. Further where the material is subjected, before the chemical treatments, to any appreciable crushing or grinding the latter have been carried only to such an extent that the material may pass through a sieve of 100 to 200 mesh per inch.

I have found, however, that greatly improved results are obtained if the starting material before being treated chemically is reduced to a much finer state of division than hitherto, viz. to a truly impalpable state. Having brought the material to an impalpable state I treat it with an alkali and then, after washing, with acid whereby on washing the product to obtain same substantially free from inorganic matter, thereafter subjecting the product to heating at a temperature of the order of 1000° to 1300° C. and upwards to expel moisture and remaining organic matter.

The alkali treatment if conducted under the conditions more particularly hereinafter set forth renders soluble in water silica and the like which is removed by washing and at the same time renders amenable to a simple extraction with acid such other impurities as lime, magnesia, alumina, titanium oxide, such as may usually be present.

My invention further consists in improvements in or relating to the manufacture of carbon, substantially as hereinafter indicated. It also consists in the improved carbon when obtained by the processes above indicated and hereinafter more fully described.

As an example of carrying the invention into effect, charcoal is pulverized to an impalpable state of subdivision, that is such as to pass through a sieve of about 300–350 mesh to the linear inch and is treated first with six-normal solution of sodium hydroxide at boiling temperature. The solid product after separation from the liquor is thoroughly mixed in and washed with hot water, being filtered therefrom and the washing and filtering repeated as often as desirable. The product is then treated with nitric acid of about 36° Baumé and boiled until the evolution of nitrous fumes ceases. The product is then repeatedly filtered and washed with water as above. With certain forms of charcoal the stronger the acid used upon it the less need there may be for working at a high temperature and by using acid of a sufficient strength it may even be unnecessary to effect heating at all.

The carbon obtained by the above steps is substantially free of inorganic impurities but in its structure and degree of blackness and like desirable properties it is not yet satisfactory and has now to be treated finally for obtaining the velvet black tint which is characteristic of the "carbon black" obtained from natural gas in the United States or that obtained by carbonization or combustion, under special conditions, of naphthalene and other hydrocarbons rich in carbon. This treatment is also for expulsion of remaining organic impurities and moisture whereby to obtain the very light and velvety impalpable form of carbon desired.

The final treatment referred to consists in subjecting the purified carbon coming from the washing after the acid treatment step to high temperature heat treatment under conditions inimical to oxidation in for example an electric furnace preferably in a neutral atmosphere, under vacuum, or in a reducing atmosphere or a gas free from oxygen, after first bringing said carbon into a very fine and preferably impalpable state of subdivision.

The above heat treatment is effected at elevated temperatures between 1000° C. and about 1300° C. Care should be taken to choose a furnace lining which is neutral to the product being treated and to the gases or vapours evolved therefrom.

If it is desired to obtain the carbon in graphite form the heat treatment may be effected at temperatures above 1300° C. or by any of the known processes.

It is to be understood that every chemical treatment and washing ought to be checked by analyses and preferably also incineration tests and if the percentage of the organic impurities as shown by such incineration or like tests is too high there may be included among the washings a washing in alcohol or other organic solvents, or such solvent may be introduced into the wash water.

It has been found that a particularly good product is obtained when the starting material is charcoal obtained from beech, oak and other non-resinous hard woods which have been carbonized at a comparatively low temperature, preferably not exceeding 300° C. The charcoal thus obtained is pulverized to impalpability and otherwise treated as above. However, resinous woods can also be used and treated in said manner.

The product obtained by the foregoing treatment can compete favourably with the best light, velvety and rich black carbons on the market today, such as those above mentioned.

It is to be understood that the above process may be modified if desired and can be applied not only to charcoal and coke but also to any other solid impure carbonized carbon material, such as the solid products of distillation of lignites, brown coal and the like.

Having now described my invention, what I claim as new and desire to secure by Letters Patent is:—

1. In the method of obtaining substantially chemically pure impalpable carbon from solid carbonized material containing organic and inorganic impurities, the steps comprising reducing said impure material to impalpability, and boiling same at ordinary pressures with caustic alkali solution of high concentration to render water-soluble any silica contained in said material and to render lime, magnesia, alumina, titanium oxide and like other impurities amenable to extraction by hot concentrated nitric acid, separating solids from said alkali solution, washing them with water to remove said soluble silica, treating the washed solids at elevated temperature with nitric acid of high concentration to extract such other impurities, removing the solid product and washing same, again reducing it to impalpability and heating it at temperatures of the order of 1000° to 1300° C. under non-oxidizing conditions to expel organic impurities and eliminate moisture.

2. In the method claimed in claim 1, employing caustic soda solution of substantially six-normal strength and nitric acid of substantially 36° Baumé and effecting complete expulsion of nitrous fumes by boiling in the acid-treatment step.

3. In the method claimed in claim 1, interposing at least one washing treatment with an organic solvent.

4. In the method claimed in claim 1, interposing at least one washing treatment with alcohol.

5. The method of obtaining chemically pure impalpable carbon which consists in effecting carbonization of substantially non-resinous beech-like wood at temperatures not substantially above 300° C. to produce charcoal and subjecting said charcoal to a purification process as claimed in claim 1.

In testimony whereof I have signed my name to this specification.

DANIEL GARDNER.